May 27, 1958
W. E. CURRIE
MAGNETIC CATHODE RAY TUBE SWEEP AMPLIFIER CENTERING CIRCUITS
Filed Sept. 7, 1954
2,836,763
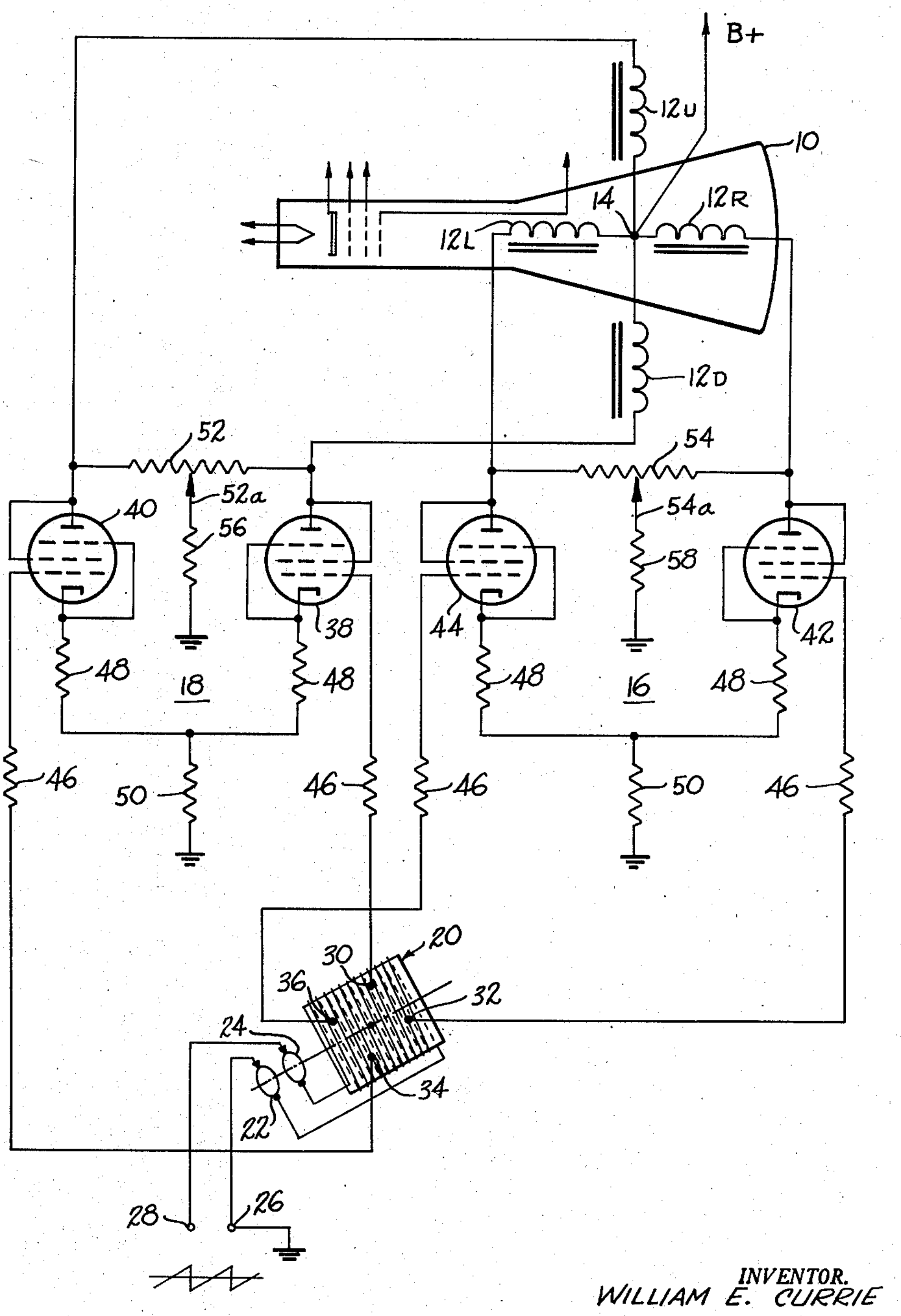
INVENTOR.
WILLIAM E. CURRIE
BY
Reynolds, Beach & Christensen
ATTORNEYS 2,836,763
Patented May 27, 1958

2,836,763

MAGNETIC CATHODE RAY TUBE SWEEP AMPLIFIER CENTERING CIRCUITS

William E. Currie, Seattle, Wash., assignor to Minneapolis-Honeywell Regulator Company, Minneapolis, Minn., a corporation of Delaware Application September 7, 1954, Serial No. 454,564

4 Claims. (Cl. 315—24)

This invention relates to electron beam push-pull sweep deflection circuits for magnetic deflection type cathode ray tube indicators, and particularly concerns an improved circuit arrangement by which the electron beam sweep deflection pattern may be centered or otherwise adjustably positioned with relation to the indicator screen without distorting or otherwise altering the sweep deflection pattern. The invention is herein illustratively described by reference to its presently preferred form as applied to a P. P. I. (plan position indicator) type sweep circuit; however, it will be recognized that certain modifications and other adaptations of the disclosed arrangement may be made within the scope of the invention.

Despite the refinements of production methods as now practiced mechanical dissymmetries occur in cathode ray tubes and their electron beam deflection apparatus. Compensation for such physical imperfections is introduced by applying to the cathode ray tube deflection plates or coils steady-state centering voltages or currents of the proper sense and magnitude, and superimposing the dynamic sweep deflection voltages or currents thereon to produce the desired sweep trace pattern on the indicator screen.

In the case of precision indicators, such as sonar P. P. I. systems, it is important that adjustment of the centering circuit means associated with a particular set of deflection elements produce no dynamic unbalance in the sweep deflection circuit driving the same elements. This requirement presents difficulties in the case of magnetic deflection type indicators requiring direct coupling between the deflection coils and their sweep deflection amplifiers. In previous deflection circuits of that class compensatory adjustments of relative steady-state current flow in opposing magnetic deflection coils to produce centering was achieved by relatively varying the quiescent plate currents in the push-pull sweep amplifier stages driving the respective coils. However, such centering adjustments would upset the normal dynamic balance of the stages and produce a distorted sweep deflection pattern. Thus the normally circular outside boundary of the conventional P. P. I. deflection pattern would be distorted into an elliptical form, or the angularly shifting radial sweep traces of the P. P. I. display would occur at non-linear time-deflection rates.

The present invention has for its general object the provision of a centering circuit arrangement for magnetic deflection push-pull amplifiers which overcomes the above-mentioned difficulty in relatively simple and effective manner. More specifically this invention provides a direct coupled magnetic deflection amplifier circuit wherein sweep centering adjustments of considerable magnitude may be made without appreciably disturbing the dynamic balance of the driver amplifier push-pull stages.

In this improved circuit arrangement, as in certain prior circuits, the mutually opposed magnetic deflection coils are individually connected in the plate circuits of the respective stages of a balanced push-pull deflection amplifier and carry the substantially equal quiescent currents of such amplifier stages. However, in accordance with the present invention as herein disclosed a potentiometer winding is connected directly between the amplifier anodes, and the wiper of this potentiometer is returned to a point of potential, such as ground, materially below quiescent plate potential for the amplifier stages. The potentiometer winding resistance is high in relation to the dynamic plate resistance of the amplifier stages and also in relation to the deflection coil ohmic resistance. Hence any repositioning of the potentiometer wiper changing the resistance ratio of the potentiometer winding complemental parts will produce simultaneous equal and opposite changes in the steady-state currents flowing in the deflection coils. At the same time, there will be no appreciable change in the quiescent currents in the amplifier stages nor, therefore, will their dynamic balance be upset. Such a potentiometer circuit means comprises in effect a resistance network furnishing separate amplifier stage by-passes the respective resistances of which may be simultaneously varied equally and oppositely in order to provide the required increment and decrement of quiescent current in the opposed deflection coils to achieve static centering in the cathode ray tube.

These and other features, objects and advantages of the invention will become more fully evident from the following description by reference to the accompanying drawings comprising a schematic diagram of a P. P. I. sweep deflection system embodying the inventive circuit.

In the example the cathode ray tube 10 is provided with two sets or pairs of electron beam magnetic deflection coils arranged about the neck of the tube in orthogonal relationship so that the coils of one pair produce electron beam deflection in a plane at right angles to that produced by the coils of the second pair. For convenience, the pair of mutually opposing coils 12U and 12D may be termed the vertical deflection coils, and the pair of mutually opposing coils 12L and 12R may be termed the horizontal deflection coils. The four coils have a common terminal 14 which is connected to the B-plus side of the power supply for the deflection amplifier circuit to be described. The usual cathode ray tube electrodes are shown in the drawing but their connections to associated circuits are omitted in order to simplify the diagram, since such connections may be of a conventional type.

The horizontal deflection coils 12L and 12R are driven by the push-pull amplifier 16 and the vertical deflection coils 12U and 12D by the similar amplifier 18. For P. P. I. applications amplitude-modulated sawtooth wave deflection voltages are applied to the control grids of the respective amplifiers 16 and 18, the modulation being in accordance with the sine and cosine functions, respectively, of the angular position of the directional element (not shown) of the sonar system or the like in which the P. P. I. functions. In the example such sine-cosine modulation is achieved by means of a so-called sine-cosine potentiometer, comprising a linearly wound potentiometer card 20 which is rotated about a central axis perpendicular to the plane of the card in accordance with the angular movement of the sonar transducer (by means not shown). Slip rings 22 and 24 are connected to the terminals of the potentiometer card winding for impressing a linear sawtooth wave voltage of constant amplitude between such terminals, as by means of input terminals 26, 28, one of which is grounded. The four stationarily mounted potentiometer winding contacts or wipers 30, 32, 34 and 36, respectively, are arranged at 90-degree angular spacing and at equal radii in relation to the rotational axis. The wipers 30 and 34 disposed oppositely from each other are connected to the control grids of amplifier tubes 38 and 40 in push-pull amplifier 18. Likewise the wipers 32 and 36 are connected to the control grids of amplifier tubes 42 and 44 of the push-pull amplifier 16. Grid current limiting resistances 46 are interposed in the potentiometer connections to the respective control grids. The cathode return of each such amplifier tube includes a small biasing resistance 48 connected in series therewith, and, for improved linearity of response, the cathode returns of the two amplifier tubes in each pair extend to ground potential through a common cathode resistance 50. Such an arrangement for applying sine and cosine modulated sawtooth wave sweep voltages to horizontal and vertical deflection coil push-pull amplifier circuits, as thus far described, represents but one convenient way, of which there are several, for controlling the flow of dynamic sweep deflection currents in the deflection amplifiers and does not constitute a necessary part of the present invention.

It will be noted in the diagram that the anode of tube 44 is connected directly to one end of horizontal deflection coil 12L, and the same is true of the anode of associated amplifier tube 42 with respect to the opposing deflection coil 12R. Similar direct coupling between the anodes of vertical deflection amplifier tubes 38 and 40 exists with respect to vertical deflection coils 12*d* and 12*u*, respectively. Assuming perfectly balanced push-pull amplifier circuits and perfectly symmetrical and balanced deflection apparatus for the cathode ray tube, there would be equal quiescent currents flowing in the respective deflection coils of each pair, and under static or steady-state conditions the electron beam would be precisely centered on the cathode ray tube screen. It is found in practice, however, that perfect balance or symmetry is not usually obtained in nominally balanced and symmetrical cathode ray tube apparatus; moreover, it is difficult to obtain perfectly matched circuit components in order to provide perfectly balanced push-pull amplifiers. In order to compensate for any such dissymmetries and unbalances in accordance with the preferred form of the present invention, a relatively high resistance potentiometer winding 52 is connected directly between anodes of tubes 38 and 40 and a similar potentiometer winding 54, between the anodes of the amplifier tubes 42 and 44. The resistance of potentiometer windings 52 and 54 is high in relation to the ohmic resistances of the deflection coils and the dynamic plate resistance of the amplifier tubes. The wiper 52*a* associated with potentiometer winding 52 is connected to ground through a current limiting or protective resistance 56, and the wiper 54*a* associated with potentiometer winding 54 is likewise connected to ground a similar resistance 58. The resistances 52 and 54 are equal, as are the resistances 56 and 58. The resistances 56 and 58 are likewise large in relation to the ohmic resistances of the cathode ray tube deflection coils and to the dynamic plate resistance of the amplifiers.

It will be evident from the diagram that the quiescent or steady-state current flowing through deflection coil 12U comprises the sum of the quiescent plate current in amplifier tube 40 and the direct current flowing in that portion of potentiometer winding 52 to the left of the potentiometer wiper 52*a*. Likewise, the quiescent or steady-state current flowing in the opposing deflection coil 12D is the sum of the quiescent current in amplifier tube 38 and the direct current flowing in that portion of potentiometer winding 52 to the right of wiper 52*a*. A similar relationship holds true with respect to the horizontal deflection coils 12L and 12R and the portions of amplifier circuit 16 corresponding to the circuit 18.

Typical circuit component values and types in the illustrative case are listed approximately as follows:

| | Ohms |
|---|---|
| Deflection coil ohmic resistance | 5000 |
| Amplifier type (6V6 triode connected) dynamic plate resistance | 5000 |
| Resistance of winding 52 | 250,000 |
| Resistance of winding 54 | 250,000 |
| Resistance 56 | 47,000 |
| Resistance 58 | 47,000 |
| Resistance 48 | 470 |
| Resistance 50 | 2200 |

While amplifier tubes 38, 40, 42 and 44 are shown as triode-connected pentodes, it will be obvious that conventionally connected pentodes and other types of amplifiers may be used in place thereof, depending upon the design requirements in particular cases.

Applying Ohm's law to the above pertinent values, movement of potentiometer wiper 52*a* from the extreme righthand end of winding 52 to the left-hand end thereof has the effect of decreasing the steady-state or direct-current in coil 12D by approximately eight milliamperes, while correspondingly increasing such current in the opposing deflection coil 12U. Assuming a cathode ray tube deflection sensitivity of eight milliamps per inch, such an adjustment of the potentiometer wiper will effect two inches of movement of the electron beam in relation to the cathode ray tube screen for centering purposes. Thus with the wiper 52*a* centered on the winding 52 and with the circuit values chosen for illustration as above, centering adjustment of the electron beam amounting to one inch up or one inch down may be achieved within the limits of the particular potentiometer centering circuit. At the same time, such adjustments of the potentiometer wiper for centering purposes have negligible effect upon the dynamic properties of the sweep deflecion circuit. With the circuit values chosen above for purposes of illustration, if the wiper 52*a* is in neutral position on the winding 52, the total shunt resistance to ground from the plate of amplifier 38, or of amplifier 40, is 172,000 ohms, hence many times the dynamic plate resistance of either such amplifier. Thus the dynamic loading on the amplifier is not appreciably affected by the presence of the by-pass potentiometer winding and wiper grounding resistance, nor by centering adjustments effected by movement of potentiometer wiper 52*a*, nor is the operating point of the amplifier affected, that is, the point on its characteristic curve from which dynamic variations in current flow take place. The same observations and relationships described with respect to amplifier 18 and vertical deflection coils 12U and 12D are equally applicable, of course, to the amplifier circuit 16 and associated horizontal deflection coils 12L and 12R.

The present invention therefore provides a highly simply and effective means by which the neutral position of a cathode ray tube electron beam may be effected in push-pull, direct-coupled magnetic deflection type circuits without affecting to any appreciable degree the dynamic operating characteristics of the sweep deflection circuits. The circuit component values and types mentioned above for purposes of illustration are, of course, in no way limiting with respect to the principles of the invention since the application of those principles to different circuits will involve design considerations governed by other requirements, but in each instance it will be readily possible to calculate suitable circuit component values to achieve the described results.

I claim as my invention:

1. Cathode ray tube indicator magnetic deflection control apparatus comprising in combination with a pair of mutually opposed magnetic deflection coils, a push-pull sweep deflection amplifier circuit including a pair of amplifiers having anodes directly coupled to corresponding ends of the respective deflection coils, input elements arranged for energization by dynamic sweep control signals, and means for passing amplifier plate currents through said deflection coils and the respective amplifiers in series therewith, said means including relatively positive and negative circuit conductors arranged for connection to the relatively positive and negative terminals of an amplifier plate voltage source; magnetic deflection static adjusting means including electrical resistance means connected as an amplifier by-pass between said negative circuit conductor and a circuit point between one of said deflection coils and the associated amplifier anode, and means manually adjustable to vary the resistance value of said by-pass resistance means and thereby vary the steady-state component of current flowing through such deflection coils and said by-pass resistance means, said resistance means having a minimum value of resistance which is high in relation to the dynamic plate resistance of such amplifier and in relation to the ohmic resistance of such deflection coil.

2. Cathode ray tube indicator magnetic deflection control apparatus comprising in combination with a pair of mutually opposed magnetic deflection coils, a push-pull sweep deflection amplifier circuit including a pair of amplifiers having anodes directly coupled to corresponding ends of the respective deflection coils, input elements arranged for energization by dynamic sweep control signals, and means for passing amplifier plate currents through said deflection coils and the respective amplifiers in series therewith, said means including relatively positive and negative circuit conductors arranged for connection to the relatively positive and negative terminals of an amplifier plate voltage source; magnetic deflection static adjusting means including a potentiometer winding connected between anodes of the respective amplifiers, and an adjustably positioned wiper engaging said winding and connected to said negative circuit conductor, the resistance value of said potentiometer winding being high in relation to the dynamic plate resistance of said amplifier and in relation to the ohmic resistance of the deflection coils.

3. The control apparatus defined in claim 2, wherein the wiper is adjustable throughout a range extending substantially from one end of the winding to the opposite end thereof, and an electrical resistance interposed in the connection between said wiper and the negative circuit conductor of a resistance value which is high in relation to the dynamic plate resistance of the amplifiers and in relation to the ohmic resistance of the deflection coils.

4. Cathode ray tube indicator magnetic deflection control apparatus comprising in combination with a pair of mutually opposed magnetic deflection coils, a push-pull sweep deflection amplifier circuit including a pair of amplifiers having anodes directly coupled to corresponding ends of the respective deflection coils, input elements arranged for energization by dynamic sweep control signals, and means for passing amplifier plate currents through said deflection coils and the respective amplifiers in series therewith, said means including relatively positive and negative circuit conductors arranged for connection to the relatively positive and negative terminals of an amplifier plate voltage source; magnetic deflection static adjusting means including a separate by-pass for each amplifier, comprising electrical resistance means connected between said negative circuit conductor and the anodes of such amplifiers, respectively, and means manually adjustable to vary the resistance values of said separate resistance means simultaneously and in respectively opposite senses, thereby to increase the steady-state component of current flowing in either deflection coil while simultaneously decreasing such component flowing in the opposing coil, the respective by-pass resistance values being reduceable by such adjustment to a minimum resistance which is high in relation to the dynamic plate resistance of such amplifiers and in relation to the ohmic resistance of such deflection coils.

References Cited in the file of this patent

UNITED STATES PATENTS

| | | |
|---|---|---|
| 2,427,263 | Dodds et al. | Sept. 9, 1947 |
| 2,474,177 | Wild | June 21, 1949 |
| 2,516,201 | Goodwin | July 25, 1950 |
| 2,562,305 | Ellsworth et al. | July 31, 1951 |

OTHER REFERENCES

"Cathode Ray Tube Displays," Radiation Laboratory Series, McGraw-Hill, 1948, pp. 373, 396, 397.